Jan. 23, 1968 A. J. WESTBROCK 3,364,654
ULTRAHIGH VACUUM PUMPING PROCESS AND APPARATUS
Filed Sept. 27, 1965 2 Sheets-Sheet 1

INVENTOR.
ADRIAN J. WESTBROCK
BY
Barnwell P. King
ATTORNEY

Jan. 23, 1968     A. J. WESTBROCK     3,364,654

ULTRAHIGH VACUUM PUMPING PROCESS AND APPARATUS

Filed Sept. 27, 1965     2 Sheets-Sheet 2

INVENTOR.
ADRIAN J. WESTBROCK
BY
Barnwell P. King
ATTORNEY

United States Patent Office 3,364,654
Patented Jan. 23, 1968

3,364,654
ULTRAHIGH VACUUM PUMPING PROCESS
AND APPARATUS
Adrian J. Westbrock, Kenmore, N.Y., assignor to Union
Carbide Corporation, a corporation of New York
Filed Sept. 27, 1965, Ser. No. 490,556
16 Claims. (Cl. 55—21)

ABSTRACT OF THE DISCLOSURE

A system for creating an ultrahigh vacuum in a space containing gases under atmospheric conditions is provided in which the gases are removed solely by low temperature cryogenic refrigeration, employing condensation baffles and optically opaque surfaces at two different refrigeration levels and adsorbent material refrigerated to the lowest temperature.

This invention relates to vacuum pumping, and more particularly to cryogenic methods and means for producing ultrahigh vacuums.

The invention provides a novel all-cryogenic method of creating an ultrahigh vacuum in a space originally containing gases under atmospheric conditions, which comprises first adsorbing most of such gases by rough pumping the space with an adsorbent material refrigerated to an intermediate low temperature, leaving residual gases which condense at a lower temperature, and then adsorbing such non-condensed residual gases by fine pumping such space with an adsorbent material refrigerated to a lower temperature, whereby a clean vacuum is created in such space.

The invention also provides a novel method of creating an ultrahigh vacuum as defined, in which such final adsorption fine pumping step is carried out in exclusive communication with such space.

Space exploration and other such activities have created increasing need for rapid evacuation systems suitable for achieving ultrahigh vacuum in chambers, such as for the development and testing of components and assemblies to be used under high vacuum conditions. There is also need for an efficient all-cryogenic pumping system for the evacuation of spaces from atmospheric conditions down to very low pressures, such as those below $10^{-6}$ Torr, as well as the need for a system capable of producing a cleaner vacuum than has been possible prior to the present invention.

To meet such needs, the invention provides a complete ultrahigh evacuation system consisting of at least one cryosorption rough pump and a cryosorption fine pump functioning in sequence, which utilizes only cryogenic pumping starting with atmospheric conditions in the space to be evacuated. This system is unique in that very low pressures are attained without reliance on any prior conventional techniques of mechanical, diffusion, or ion pumping, which inherently result in some undesirable contamination of the vacuum space.

The invention, by virtue of the fact that it contains no source of contamination, assures the rapid achievement of a clean, ultrahigh vacuum space. Such space is entirely free of undesirable hydrocarbons, such as those produced either by back-streaming of oil vapors or similar pumping fluid contaminants which occur from mechanical and/or diffusion type pumps, or hydrocarbons produced within ion type pumps from reactions of hydrogen with carbon impurities in the pump element. The invention also obviates the need for any auxiliary mechanical or diffusion pumping, and additionally has the very important advantage of producing a clean vacuum.

In the invention, cryosorption rough pumping is first used to evacuate the space to a moderately low pressure, such as about $10^{-2}$ Torr. An efficient cryosorption rough pump, utilizing an internal finned tube heat exchanger for cooling the adsorbent effectively, for example, is described in application Serial No. 362,878, filed April 20, 1964 and abandoned in favor of continuation-in-part application Serial No. 598,548 filed October 10, 1966.

Cryopumping, which is also utilized in the instant vacuum pumping process, is the reduction in chamber pressure by condensation of gaseous species on low temperature surfaces and is basically a phase equilibrium phenomenon. Thus, the effectiveness of cryopumping in reducing chamber pressures depends not only on the temperature level of the cryopanel surface, but also on the gas composition within the chamber being evacuated. As a consequence, even small traces of lower boiling gases such as hydrogen and helium remaining result in relatively high chamber pressures even at cryopanel temperature of near 4° K. Such high pressures are caused by the relatively high vapor pressure of hydrogen and helium even at 4° K. In an ultrahigh vacuum system, a major gas load is hydrogen arising from diffusion of dissolved gas from the metal chamber walls. Thus, other methods must be utilized in combination with cryopumping to reduce pressure to the ultrahigh vacuum region.

Cryosorption, or the ability of solid adsorbent materials such as charcoal, silica gel, and molecular sieve to physically adsorb large quantities of gases at temperatures near the normal boiling point of the adsorbate, is utilized in both the rough and fine pumping steps. The practicability of dynamic vacuum pumping of gaseous hydrogen by molecular sieve bonded to a metal panel refrigerated to about 20° K. is disclosed in U.S. Patent No. 3,296,773, issued January 10, 1967, to R. A. Hemstaeet. This has led to cryogenic fine pumping arrangements incorporating both cryopumping surfaces and cryosorption panels. The cryopumping surfaces refrigerated with helium or hydrogen to the 4–20° K. range are utilized for removal of the condensable species (oxygen and nitrgoen), and the cryosorption panels are similarly refrigerated and used for pumping the lowest boiling "noncondensable" gases. Water vapor and carbon dioxide are cryopumped with a liquid nitrogen temperature baffle located in front of the cryosorption panel.

According to the present invention, such cryogenic pumping components are arranged, either in separate enclosures for attachment to the space to be evacuated via a conduit, or are located internally and integrated with a vacuum chamber to create a clean ultrahigh vacuum, starting with atmospheric conditions in the space to be evacuated.

For producing ultrahigh vacuum pressures, such as below $10^{-6}$ Torr, using either the external or internal type fine cryosorption pumps, as defined with respect to the chamber or the space being pumped, certain construction features become relatively important in the fine cryosorption pumps. For example, since much smaller masses of gas are being removed when fine pumping a particular size space as compared to rough pumping, correspondingly smaller quantities of adsorbent material are needed. Also, substantially improved gas conductances are provided as compared to the cryosorption roughing pumps. In addition, effective means for shielding the refrigerated adsorbent surfaces from radiation sources and thereby reduce the refrigeration requirement are quite important.

Ideally from pumping speed considerations, the cryosorption panel should be located in the enclosure of the space being pumped with no geometrical conductance restrictions to the molecular flow of the gases. However, since refrigeration at or below 20° K. is quite expensive, a compromise is effected between desired high gas conductance and low radiation heat load to minimize refrigeration requirements for the panel. This compromise results in an "array" of components, consisting basically of an optically opaque baffle refrigerated to an intermediate low temperature with liquid nitrogen or other cryogenic fluids, being placed between the colder cryosorption panel and the gases to be condensed or adsorbed. As indicated, such cryogenic pumping arrays for achieving very low vaccum such as below $10^{-6}$ Torr are arranged either in (1) a separate enclosure fine pump connected to the space to be evacuated through a conduit (external type pump), or (2) as an integral cryosorption fine pump located within the space to be evacuated (internal type pump).

Careful selection of the number, location and shape of the radiation baffles shielding the colder cryosorption panel results in satisfactorily low refrigeration requirements. Although a most important consideration relative to the external type fine vacuum pump is to provide good gas conductance for reasonably fast pumping speed, the baffle surfaces shielding the cryosorption panel are preferably separated somewhat wider apart in the external type pump than for the internal type pump for reasons of securing low heat leak and for adequate access to the inner parts.

Figure 1:
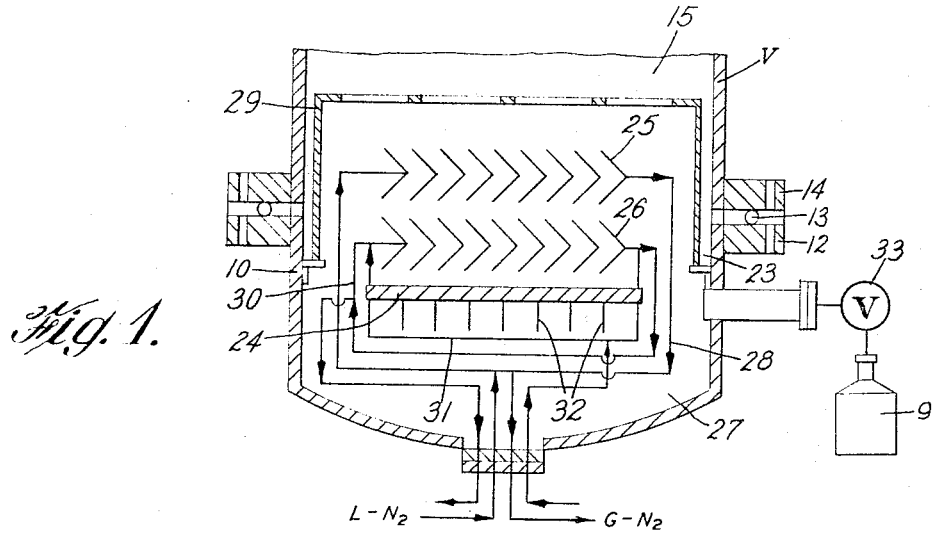
FIGURE 1 is a view mainly in vertical section taken on line 1—1 of FIG. 2, showing one form of the invention.
Figure 2:
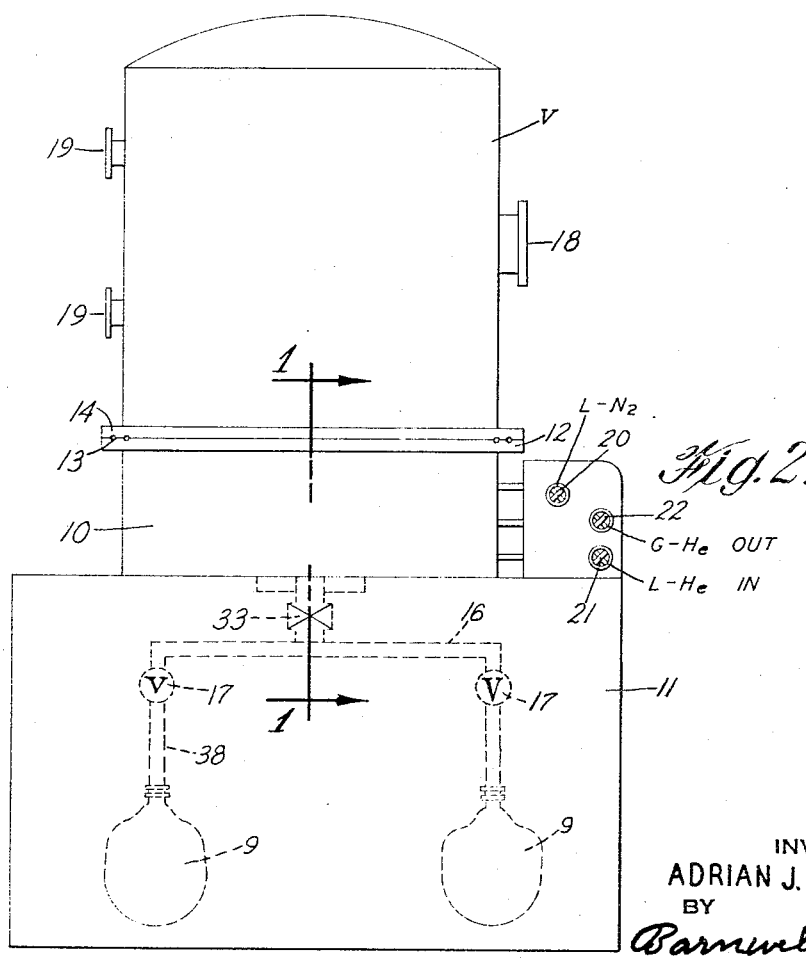
FIGURE 2 is a view mainly in side elevation of an all-cryogenic pumping system comprising cryosorption rough pumps and a cryosorption fine pump of the internal type.

The general arrangement of an all-cryogenic pumping system comprising cryosorption rough pumps 9, 9 and a cryosorption internal type fine pump 10 is illustrated by FIGS. 1 and 2. A hollow frame 11 supports the pump 10 which is provided with annular flange 12. The latter supports an O-ring seal 13 on which a corresponding flange 14 of the vacuum chamber V is mounted. The rough pumps 9 are connected to the space 15 to be evacuated by pipes 16, that are provided with valves 17 for alternate or sequential pump operation. The vacuum chamber may be provided with one relatively large viewing port 18 on one side and two relatively small ports 19, 19 on the other side. Flow of a suitable refrigerant fluid, such as liquid nitrogen, to the fine pump 10 is controlled by a valve 20, while flow of a suitable refrigerant fluid such as liquid or cold gaseous helium to fine pump 10 is controlled by an inlet valve 21. Gaseous helium exhaust from the pump 10 is controlled by an outlet valve 22.

The internal type cryosorption pump 10 functionally is not conductance-limited because the pump throat 23 is located inside the chamber V to be evacuated. Also, the various parts (cryosorption panel 24 and baffles 25, 26) may be located relatively close together without incurring fabrication problems. Such a compact array is also desirable in that it minimizes that portion of chamber space of the common enclosure 27 occupied by the fine pumping components.

The internal type pumping array is illustrated by FIGURE 1. It utilizes the chevron type baffles 25, 26 with the upper or front set of baffles 25 and outer cup-shaped radiation shield 28 refrigerated to an intermediate low temperature, such as with liquid nitrogen at or below 80° K., and exhausts as gaseous nitrogen. Alternatively, other baffle shapes may be used. Such baffles and attached shield 28 serve to absorb the bulk of the direct primary thermal radiation from the test specimens on shelf 29 and chamber walls, and also "cryopump" the $CO_2$ and water vapor. Pump operation using both cryopumping and cryosorption surfaces and techniques, as described above, also provide for efficient thermal shielding of the cryosorption panel 24. The latter is protected from excessive thermal radiation loads by one or more baffles 26 and attached shield 30 that are refrigerated to the lowest temperature by liquid or gaseous helium, and serving as the air cryopanels inserted in front of and structurally surrounding the adsorbent surface. This arrangement provides for the radiant heat and mass loads to be desirably handled at the highest temperature level consistent with overall pump performance.

In addition, to providing protection against excessive secondary radiant loads, the cryopanel chevron baffle 26 functions as a filter to prevent higher boiling species (air gases) from passing through and being cryosorbed on panel 24 at the lowest temperature level or about 4° K. This precaution is desirable for efficient utilization of the cryosorption panel for pumping non-condensable gases. The cryopumping surface is shielded in turn by the outer liquid nitrogen refrigerated, optically opaque chevron baffle arrangement 25 and attached shield 28. This outer cryogenically cooled surface, as well as the shield or shroud 28, is provided for cryopumping water vapor and completely encloses the inner lower-refrigerated elements.

The respective elements of the internal type pump 10 are usually refrigerated from a liquid nitrogen Dewar (not shown) and a liquid helium storage Dewar (not shown). The liquid nitrogen addition or circulation is usually continuous, whereas the liquid helium refrigerant is preferably added at intervals to a reservoir 31 which is in intimate thermal contact with the cryosorption panel 24. Conductive metal bars or plates 32 are preferably provided to keep the adsorbent surface refrigerated at the lowest possible temperature even at reduced liquid levels within the reservoir. Latent heat refrigeration is utilized to maintain the adsorbent near 4° K., and the cold vapor evolved is routed to the surrounding baffle 30 and shield 28 where sensible heating to about 15° K. occurs due to imposed heat loads, i.e., radiation, conductive losses, and gas condensation. Vacuum-tight valve 33 is provided to close off the rough pump 9 whenever fine pumping is in operation.

Figure 3:
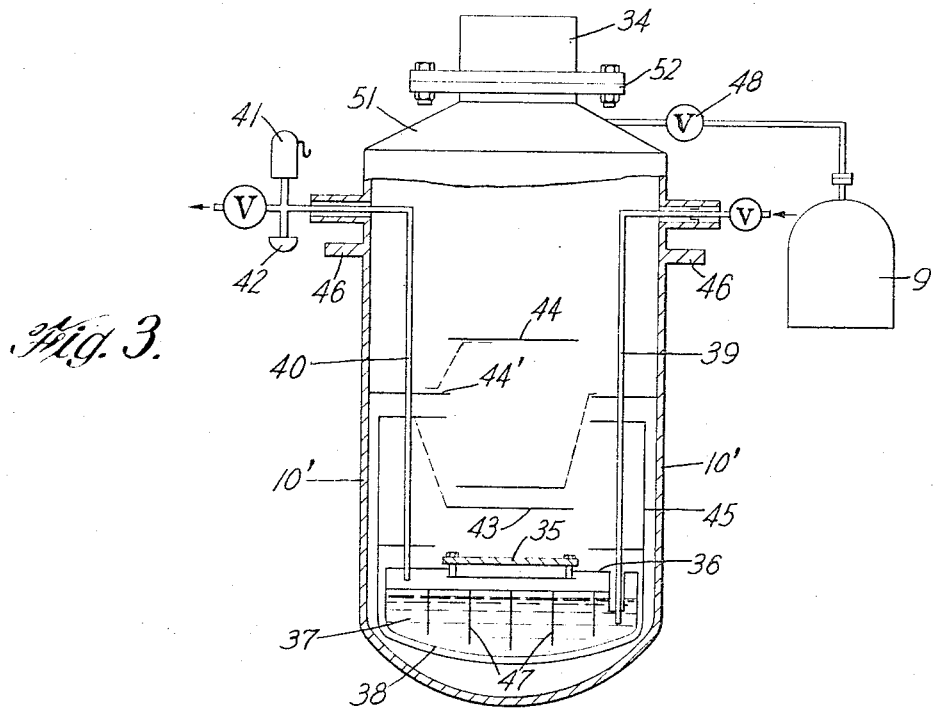
FIGURE 3 is a view mainly in cross section of a modification of the invention employing an external type cryosorption fine pump.
Figure 4:
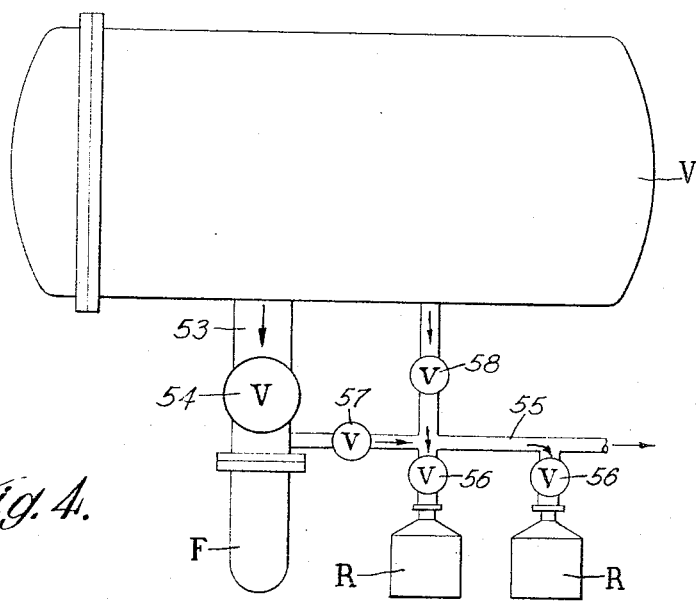
FIGURE 4 is an elevational view of another modification of the invention employing an external type cryosorption fine pump.

The general configuration of a cryogenic pumping system using a cryosorption rough pump and a cryosorption external type fine pump is illustrated by FIGURES 3 and 4. In the FIGURE 4 arrangement, the rough pump and fine pump are adapted to be connected separately to the space chamber V through vacuum-tight shut-off valves.

A typical arrangement of a separate type (external) fine pump is illustrated by FIGURE 3. This pump 10' is generally shaped like a wide-mouth elongated Dewar flask having a large access opening 34 in communication with the chamber or space to be evacuated to provide for good gas conductance into the pump in the free molecular flow regime. Adsorbent panel 35 is supported on inner surface 36 and is refrigerated directly by the lowest temperature refrigerant, such as liquid helium 37, contained in reservoir 38 located at the lower end of the pump chamber opposite opening 34. The liquid helium refrigerant is transferred into reservoir 38 in batches as required through fill conduit 39, and the evaporation gas is led away through vent conduit 40 which contains suitable pressure relief devices 41, 42 at its outer end.

As described previously for the internal type fine pump, the adsorbent surface is protected from direct radiation from the warm end opening of the pump by one or more refrigerated baffles 43 and 44, which are arranged to be optically opaque, and may be made either flat as shown, or chevron shaped. Such baffles are cooled to progressively lower temperature levels in the locations nearer the adsorbent panel 35. The inner baffle 43 and its corresponding shield 45 are refrigerated in series by the cold evaporation gas derived from the liquid refrigerant 37 for the cryosorption panel 35. The outer baffle 44 and its corresponding shield or casing 44', completely surrounding the cryosorption panel 35 and reservoir 38, are preferably refrigerated to an intermediate low temperature with an external refrigerant such as liquid nitrogen, since a much greater head load exists at this point. A preferred arrangement for cooling the pump casing and the first or outer shields is to surround the pump with a liquid nitrogen bath retained in an insulated outer container (not shown) and attached to the pump at flange 46.

When using such ultrahigh vacuum pump, the space being evacuated is initially pumped down to about $10^{-2}$ to $10^{-3}$ Torr pressure by at least one rough cryosorption pump 9 as mentioned above, so that only minute traces of gases remain to be removed by the fine pump 10'. Thus, having a large exposed surface of cooled adsorbent is relatively more important than the total quantity of adsorbent provided in the fine pump. If desired, such adsorbent may be bonded in a thin layer (about $\frac{1}{64}$ to $\frac{1}{8}$ in. thick) to surface 36, in accordance with U.S. Patent No. 3,296,773. Alternatively, a thin bed of adsorbent material in granular or pellet form mechanically retained on surface 36 may be used. It is important that the temperature of the adsorbent be maintained quite close to that of the refrigerant by utilization of the latent heat refrigeration. Conductive bars or plates 47 are preferably provided extending into the reservoir to help refrigerate the adsorbent even at reduced liquid levels within the reservoir. Also, although the cryosorption panel 35 may be made removable, it is preferably made integral with the liquid reservoir to provide for better heat transfer therebetween. In addition, such cryosorption panel constructions may be used with either the internal or external type fine pumps.

The exact shape of the adsorbent coated surface of the fine pump is not critical. Either flat, concave, or compartmented surfaces may be used. The latter may serve to trap the gas molecules better than flat or only slightly curved surfaces. The reason is that a portion of the gas molecules being pumped are believed to be momentarily adsorbed and then reemitted from the adsorbent surface in a direction usually substantially perpendicular to it. Also, portions of a compartmented adsorbent surface do not receive direct radiation from the high temperature baffle surfaces. Thus, a trapping arrangement, such as that provided by a curved panel or by parallel panel arrangements, is helpful in preventing the adsorbed molecules from being re-emitted to the space being pumped. As stated, the adsorbent panel 35 may be made removable from reservoir 38 in order to be replaced if ever necessary, after first removing the baffles covering the panel.

When a fine cryosorption pump is used in combination with a rough cryosorption pump, suitable vacuum-tight shut-off means such as UHV valve 48 is provided in the conduit to the rough pump 9. While the rough pump 9 may be connected directly to the space being evacuated through a vacuum-tight shut-off valve (not shown), it may alternatively be connected directly to the fine pump 10' as illustrated in FIGURE 3, since this arrangement permits independent testing of the complete evacuation system prior to its being connected to the space to be evacuated. Also, transition piece 51 may be used to adapt the pump casing to flange connection 52 for the space being pumped.

Also if desired, an external type fine pump F may be separately connected to vacuum chamber V by conduit 53 containing an UHV shut-off valve 54, as illustrated by FIGURE 4. A plurality of rough pumps R, R are connected to a common header 55 by shut-off valves 56, 56—the header being connected to conduit 53 by valve 57, and to the vacuum chamber V by a valve 58, thus permitting the independent operation of the rough and fine pumps. Such independent pump operation may be advantageous in situations where it is desired to cycle the vacuum chamber V back to atmospheric pressure periodically without the necessity of warming up and repressurizing the fine pump F. Also if desired, interconnecting conduit 55 containing UHV valve 57 may be used to rough pump the fine pump enclosure F before it is connected to the chamber V via valve 54, thus reducing the pumpdown time for the chamber V. Also in another configuration, both the rough pump and the fine pump may be located within the chamber enclosing the space to be evacuated.

An efficient cryogenic pumping system capable of long-term operation must take into account many factors. Taken in order, the desired operating pressure and imposed gas load will dictate the use of certain areas of cryogenic surfaces of known pumping speed needed to meet these requirements. However, it must be realized that the factor which may limit the pumping speed of the total array is not the surface area of the cryosorption panel behind the baffle array, but rather the cross-sectional area available for free molecular flow. However, in the case of cryosorption the capacity of the adsorbent material must also be considered. While it is true that free molecular flow area will determine pumping speed, the total capacity of the adsorbent material may limit continuous pumping time. (An analogous but less predictable result will occur with cryopumping systems, in that build-up of solids will ultimately limit the pumping capacity of the cryopanel.) Thus, if desired, the proposed cryogenic pumping array can be made to allow for long-term operation, such as one to six months, by sizing the adsorbent mass to be consistent with the expected noncondensable gas loads to be removed.

The cryosorption fine pump of this vacuum pumping system requires supplying the lowest temperature refrigerant liquid, preferably liquid helium, to the cryosorption panel, where the latent heat is available for refrigeration. Subsequent sensible heating of the helium vapor from about 5° K. to about 15° K., satisfies refrigeration requirements of the intermediate baffles or cryopanels. The total refrigeration requirements are principally a function of the heat load incident on the array, and may be held to very low values. For example, for evacuating a small chamber 30 in. I.D. x 36 in. long, refrigeration requirements for the fine pump based on ambient temperature objects radiating to the array are estimated to be:

|   | Liters per hour |
|---|---|
| Steady-state liquid helium requirement | 0.2–0.3 |
| Steady-state liquid nitrogen requirement | 8 |

Alternatively, the refrigeration requirements for the fine pump may be supplied by a gaseous helium refrigerator, from which the cold liquid and gaseous streams may be supplied separately, if desired, and directed to the various surfaces as previously described. Such a refrigerant supply arrangement will usually be used for larger capacity fine pumps.

In summary, the major advantages provided by this all-cryogenic pumping system approach to space evacuation include:

(1) Produces ultraclean vacuum — no source of contamination exists such as oil backstreaming from diffusion pumps or hydrocarbons in ion pumps.

(2) High pumping speeds obtained even at low absolute pressures.

(3) No loss of vacuum as a result of power supply interruption.

(4) Minimum equipment maintenance because no moving parts are needed.

(5) Very low ultimate pressure is achievable.

Typical operation of the vacuum pumping system proceeds in the following general sequence: The chamber V is closed and rough pumped by cryosorption pumping to approximately 1–10 microns (0.1–1 Torr). A chamber bakeout system, if used, may then be activated and the chamber heated to approximately 250° C. During chamber bakeout, the liquid helium reservoir of the fine pump is preferably heated with hot gas such as nitrogen to provide proper activation of the adsorbent material attached thereto. The hot gaseous nitrogen is also routed through the cooling coils of the baffles and shroud, and may be provided either from an external heater, or obtained by passing ambient temperature nitrogen gas from a storage cylinder through cooling coils located on the chamber walls adjacent to bakeout heaters which may be used during the bakeout procedure. Also, electric resistance heaters may be attached directly to the cryosorption panel, if desired. Bakeout would be continued for a period of approximately 12 hours, after which the system may be cooled by circulating air or water through the cooling coils. After the system is at ambient temperature and a pressure of about 1 micron, the cryogenic fine pump array (all elements) are precooled with liquid nitrogen. After the system being evacuated reaches a constant low pressure, the liquid refrigerant reservoir and cryosorption panel are cooled from about 80° K. to a lower temperature, preferably to about 4° K. with liquid helium. After filling the liquid reservoir of the fine pump, flow of the liquid helium from the storage Dewar is shut off and steady-state pumping operation is commenced. When the liquid helium in the reservoir is nearly consumed, it is refilled from the storage Dewar.

Whenever the bakeout step is used for large chambers for which an extended pumping period is required, it may be desirable to use a second cryosorption rough pump refrigerated to a lower temperature by liquid hydrogen or helium to remove substantially all the initially liberated non-condensible gases before the cryosorption fine pump is placed in operation.

Rough cryosorption pumps usually contain provisions for reactivation by separately heating and purging the adsorbent material. The cryosorption fine pumps are preferably reactivated by flowing hot gas through the refrigerant passages and the reservoir. However, the integral type fine pumps are often reactivated during the chamber bakeout step, or may have individual heating means such as electric heaters for reactivating the adsorbent on the cryosorption panel.

Novelty resides in (1) combination of cryosorption fine pump with cryosorption rough pump(s), used in sequence to provide an all-cryogenic pumping system capable of producing ultrahigh vacuum free of hydrocarbon molecules; (2) the use of a quantity of liquid refrigerant stored in a reservoir thermally attached to the cryosorption panel, thus permitting a reasonable quantity of the liquid refrigerant to be transferred more efficiently at intervals instead of transferring it continuously at a very low flow rate; (3) specific arrangements of the cryosorption panel having associated cryopumping shields and shrouds utilizing the sensible heat of the evaporation gas to refrigerate the cryopumping surfaces used in the fine pumps, such as the removable cryosorption panel, and (4) an all-cryogenic pumping system consisting of cryosorption rough pumps followed by cryosorption fine pumps of either the external or internal type.

As used herein "ultrahigh" vacuum means a pressure of $10^{-6}$ Torr or below; cryosorption "fine" pump means one capable of reducing pressure within a space from intermediate to ultra-high vacuum; and cryosorption "rough" pump means one capable of reducing pressure from atmospheric to an intermediate vacuum of about $10^{-3}$ Torr. A "clean" vacuum is one that is free of any contamination that was not present in the original space, as well as being free of undesirable contamination.

What is claimed is:
1. Method of creating an ultrahigh vacuum in a space originally containing higher and lower boiling condensible and non-condensible gases under atmospheric conditions, which comprises first adsorbing most of such gases by contacting and rough pumping the space with a first adsorbent material refrigerated to an intermediate low temperature leaving residual gases at least some of which condense at lower temperature; terminating the first adsorbent material—gas contacting; next fine pumping said space by initially contacting said residual gases with first condensing surfaces and first optically opaque surfaces both refrigerated at intermediate low temperature for respectively condensation removal of said higher boiling condensibles and absorption of thermal radiation, and then contacting the remaining portion of said residual gases with second condensing surfaces and second optically opaque surfaces both refrigerated at lower temperature for respectively condensation removal of said lower boiling condensibles and further absorption of thermal radiation leaving non-condensible gas; and then adsorbing such non-condensible gas to ultrahigh pump such space by contacting with a second adsorbent material refrigerated to a lower temperature, whereby a clean vacuum is created in such space.

2. Method as defined by claim 1, including the step of refrigerating said second adsorbent by providing a lowest temperature refrigerant fluid in a reservoir having the second adsorbent material in close thermal contact with one side thereof.

3. A method according to claim 1 in which liquid nitrogen cools said first condensing surfaces and first optically opaque surfaces to said intermediate low temperature.

4. A method according to claim 1 in which gaseous helium cools said second condensing surfaces and second optically opaque surfaces to said lower temperature.

5. Method of creating an ultrahigh vacuum in a space originally containing gases including water, carbon dioxide, oxygen, nitrogen, and hydrogen which comprises first absorbing part of such gases by contacting and rough pumping the space with a first adsorbent material refrigerated to an intermediate low temperature leaving residual gases at least some of which condense at lower temperatures; terminating the first adsorbent material—gas contacting; next fine pumping said space by initially contacting said residual gases with first condensing surfaces and first optically opaque surfaces both refrigerated at liquid nitrogen temperature for respective condensation of said water and carbon dioxide and absorption of thermal radiation, and then contacting the remaining portion of said residual gases with second condensing surfaces and second optically opaque surfaces both refrigerated colder than said first surfaces at gaseous helium temperature for condensation of said oxygen and nitrogen and further absorption of thermal radiation, and then adsorbing said hydrogen gas to ultrahigh pump such space by contacting with a second adsorbent material refrigerated at liquid helium temperature, whereby a clean vacuum is created in such space.

6. A cryogenic vacuum pumping system capable of creating an ultrahigh vacuum in a space originally containing gases under atmospheric conditions comprising in combination: a chamber enclosing said space to be evacuated; cryosorption rough pump means for removing part of said gases; conduit means providing communication between said cryosorption rough pump means and said space; valve means in said conduit means for controlling and terminating such communication; and a cryosorption fine pump in communication with such space, comprising a multiplicity of first spaced condensation baffles and a first optically opaque shield and means for refrigerating said first baffles and shield to an intermediate low temperature for respectively removing higher boiling condensibles and absorption of thermal radiation, a multiplicity of second spaced condensation baffles and a second optically opaque shield and an adsorbent material, and means for refrigerating said second baffles, shield and adsorbent to lower temperature for respectively removing lower boiling condensibles, further absorption of thermal radiation, and adsorption of non-condensible gas from said space.

7. A cryogenic pumping system as defined by claim 6, in which said fine pump is located within said chamber.

8. A cryogenic vacuum pumping system, as defined by claim 6, in which said fine pump is located in an external enclosure that is connected to said chamber.

9. A cryogenic vacuum pumping system, as defined by claim 8, which also includes valve means for controlling and terminating the communication between said fine pump means and such space.

10. A cryogenic vacuum pumping system as defined by claim 6, which includes a plurality of cryosorption rough pumps, and separate valve means for individually controlling the communication of each rough pump with such space.

11. A cryogenic pumping system, as defined by claim 6, in which said fine pump is located within the chamber enclosing such space and includes a reservoir for holding refrigerant fluid in close thermal contact with the adsorbent.

12. A system as defined by claim 6, in which the rough pump means comprises a plurality of rough pumps, a header joining said conduit means, means including a separate shut-off valve connecting each rough pump to said header, and means including a shut-off valve connecting said header to said fine pump, and a conduit including a shut-off valve connecting said fine pump to such vacuum space.

13. A cryogenic vacuum pumping system, as defined by claim 6, in which said first optically opaque shield surrounds said second condensation baffles, said second optically opaque shield and said adsorbent material.

14. A cryogenic vacuum pumping system capable of creating an ultrahigh vacuum in a space originally containing gases including water, carbon dioxide, oxygen, nitrogen and hydrogen comprising in combination: a chamber enclosing said space to be evacuated; cryosorption rough pump means for removing part of said gases; conduit means providing communicating between said cryosorption rough pump means and said space; valve means in said conduit mean for controlling and terminating said communication; and a cryosorption fine pump in communication with such space, comprising a multiplicity of first spaced condensation baffles and a first optically opaque shield and means for refrigerating said first baffles and shield to liquid nitrogen temperature for respective condensation of said water and carbon dioxide and absorption of thermal radiation, a multiplicity of second spaced condensation baffles and a second optically opaque shield and means for refrigerating said second baffles and shield to gaseous helium temperature for respective condensation of said oxygen and nitrogen and further absorption of thermal radiation, adsorbent material and means for refrigerating said adsorbent material to liquid helium temperature for adsorption of said hydrogen, said first optically opaque shield being arranged and positioned to surround said second baffles and shield and adsorbent material and said second optically opaque shield being arranged and positioned to surround said adsorbent material.

15. An ultrahigh vacuum pumping system, as defined by claim 14, in which said cryosorption fine pump means comprises one of the internal type.

16. An ultrahigh vacuum pumping system as defined by claim 14, in which said cryosorption fine pump means comprises one of the external type.

References Cited
UNITED STATES PATENTS

| | | | |
|---|---|---|---|
| 3,172,748 | 3/1965 | Feinleib et al. | 55—389 |
| 3,264,803 | 8/1966 | Read | 55—389 X |
| 3,283,479 | 11/1966 | Batzer et al. | 55—389 X |
| 3,296,773 | 1/1967 | Hemstaeet | 55—208 X |

OTHER REFERENCES

Bannock, R. R.: Molecular Sieve Pumping. In Vacuum, vol. 12, March–April 1962, Pages 101–106.

REUBEN FRIEDMAN, *Primary Examiner.*

J. ADEE, *Assistant Examiner.*